United States Patent
Moore et al.

(10) Patent No.: US 10,304,055 B2
(45) Date of Patent: May 28, 2019

(54) TRANSACTION PROCESSING AND REMOTE ACTIVATION

(71) Applicant: M-Kopa IPR, LLC, Wilmington, DE (US)

(72) Inventors: Jesse Keith Barton Moore, Nairobi (KE); Nicholas Hughes, Alresford (GB)

(73) Assignee: M-Kopa IPR, LLC, Wilmington, DE (US)

( * ) Notice: Subject to any disclaimer, the term of this patent is extended or adjusted under 35 U.S.C. 154(b) by 0 days.

(21) Appl. No.: 15/397,414

(22) Filed: Jan. 3, 2017

(65) Prior Publication Data

US 2017/0116595 A1 Apr. 27, 2017

Related U.S. Application Data

(62) Division of application No. 13/699,297, filed as application No. PCT/IB2011/000998 on May 10, 2011, now Pat. No. 9,536,239.

(30) Foreign Application Priority Data

May 20, 2010 (GB) .................................. 1008368.1
May 27, 2010 (GB) .................................. 1008910.0

(51) Int. Cl.
*G06Q 20/38* (2012.01)
*G06Q 20/32* (2012.01)
(Continued)

(52) U.S. Cl.
CPC .............. *G06Q 20/38* (2013.01); *G06Q 20/24* (2013.01); *G06Q 20/3224* (2013.01);
(Continued)

(58) Field of Classification Search
CPC .... G06Q 20/38; G06Q 20/3224; G06Q 30/06; G06Q 20/24; G07F 15/003; G07F 15/006;
(Continued)

(56) References Cited

U.S. PATENT DOCUMENTS 4,624,578 A * 11/1986 Green .................. G06Q 20/127
340/309.8
4,700,296 A * 10/1987 Palmer, Jr. ........... G06Q 20/342
235/382
(Continued)

FOREIGN PATENT DOCUMENTS

JP 2004-220350 A 8/2004
KR 10-2007-0055106 A 5/2007
(Continued)

OTHER PUBLICATIONS

Bladin, "Improving Microfinance through Telecommunications," *Perspectives*, Spring 2007:15-19, 2007.
(Continued)

*Primary Examiner* — Kenneth Bartley
(74) *Attorney, Agent, or Firm* — Seed Intellectual Property Law Group LLP

(57) ABSTRACT

An embodiment of the invention extends to a device (which may be considered an asset that is purchased or which provides a service that may be purchased) that can be controlled through the use of a mobile communications apparatus such as a cellular phone. The cellular phone is connected to a transaction processing system that allows a user to pay for the use of the device. The transaction processing system communicates with the device to allow usage of the device only if the user has successfully paid for such use. A further embodiment of the invention relates to collecting usage information of the device and collating this information at a location remote from the device.

22 Claims, 4 Drawing Sheets

(51) Int. Cl.
*G06Q 30/06* (2012.01)
*G07F 15/00* (2006.01)
*G07F 15/12* (2006.01)
*G07F 17/00* (2006.01)
*G06Q 20/24* (2012.01)
*H05B 37/02* (2006.01)
*H05B 37/00* (2006.01)

(52) U.S. Cl.
CPC ........... *G06Q 30/06* (2013.01); *G07F 15/003* (2013.01); *G07F 15/006* (2013.01); *G07F 15/12* (2013.01); *G07F 17/0014* (2013.01); *H05B 37/00* (2013.01); *H05B 37/02* (2013.01); *H05B 37/0272* (2013.01); *Y04S 50/10* (2013.01); *Y04S 50/12* (2013.01)

(58) Field of Classification Search
CPC . G07F 15/12; G07F 17/0014; H05B 37/0272; H05B 37/02; H05B 37/00; Y04S 50/10; Y04S 50/12
See application file for complete search history.

(56) References Cited

U.S. PATENT DOCUMENTS

| | | | |
|---|---|---|---|
| 5,046,093 A | 9/1991 | Wachob | |
| 5,221,838 A | 6/1993 | Gutman et al. | |
| 5,367,330 A | 11/1994 | Haave et al. | |
| 5,490,200 A * | 2/1996 | Snyder | B60R 25/04 340/7.1 |
| 5,506,572 A | 4/1996 | Hills et al. | |
| 5,555,551 A | 9/1996 | Rudokas et al. | |
| 5,819,869 A * | 10/1998 | Horton | B60R 25/04 180/287 |
| 5,848,054 A | 12/1998 | Mosebrook et al. | |
| 5,887,266 A | 3/1999 | Heinonen et al. | |
| 5,943,423 A | 8/1999 | Muftic | |
| 6,025,774 A * | 2/2000 | Forbes | B60R 25/00 235/384 |
| 6,026,922 A * | 2/2000 | Horton | B60R 25/04 180/287 |
| 6,078,806 A | 6/2000 | Heinonen et al. | |
| 6,157,317 A * | 12/2000 | Walker | B60R 25/04 307/10.3 |
| 6,195,648 B1 * | 2/2001 | Simon | B60R 25/04 235/382 |
| 6,249,217 B1 * | 6/2001 | Forbes | B60R 25/00 235/384 |
| 6,349,314 B1 | 2/2002 | Patel | |
| 6,535,726 B1 | 3/2003 | Johnson | |
| 6,917,853 B2 * | 7/2005 | Chirnomas | G07F 5/18 700/237 |
| 6,950,807 B2 * | 9/2005 | Brock | G06Q 10/087 705/35 |
| 7,266,507 B2 * | 9/2007 | Simon | B60R 25/2018 705/35 |
| 7,362,213 B2 | 4/2008 | Cohen | |
| 7,677,753 B1 | 3/2010 | Wills | |
| 8,311,521 B1 | 11/2012 | Paczkowski et al. | |
| 2002/0082917 A1 * | 6/2002 | Takano | G06Q 20/123 705/26.1 |
| 2002/0123964 A1 * | 9/2002 | Kramer | G06Q 20/04 705/40 |
| 2002/0128932 A1 | 9/2002 | Yung et al. | |
| 2003/0046244 A1 | 3/2003 | Shear et al. | |
| 2004/0067746 A1 | 4/2004 | Johnson | |
| 2004/0176978 A1 * | 9/2004 | Simon | B60R 25/2018 705/35 |
| 2005/0071264 A1 | 3/2005 | Tsoa-Lee et al. | |
| 2005/0131810 A1 | 6/2005 | Garrett | |
| 2005/0162016 A1 * | 7/2005 | Simon | B60R 25/00 307/10.4 |
| 2005/0251474 A1 | 11/2005 | Shinn et al. | |
| 2006/0031180 A1 | 2/2006 | Tamarkin et al. | |
| 2006/0108417 A1 * | 5/2006 | Simon | G06Q 10/06 235/382 |
| 2006/0136314 A1 * | 6/2006 | Simon | G06Q 20/1085 705/35 |
| 2006/0284734 A1 | 12/2006 | Newman, Jr. | |
| 2007/0060200 A1 | 3/2007 | Boris et al. | |
| 2007/0061268 A1 | 3/2007 | Herold et al. | |
| 2007/0100701 A1 * | 5/2007 | Boccon-Gibod | G06F 21/10 705/21 |
| 2007/0185728 A1 * | 8/2007 | Schwarz | G06Q 10/06 701/36 |
| 2007/0185814 A1 * | 8/2007 | Boccon-Gibod | G06F 21/10 705/51 |
| 2007/0194881 A1 * | 8/2007 | Schwarz | G06Q 10/06 340/5.31 |
| 2008/0053716 A1 * | 3/2008 | Scheucher | B60L 8/00 180/2.1 |
| 2008/0109334 A1 * | 5/2008 | Lewis | G06Q 40/00 705/35 |
| 2008/0172346 A1 * | 7/2008 | Kremen | G06Q 20/102 705/412 |
| 2008/0184026 A1 | 7/2008 | Hall et al. | |
| 2008/0221743 A1 * | 9/2008 | Schwarz | G06Q 30/06 701/2 |
| 2008/0319908 A1 | 12/2008 | Venkatachalam et al. | |
| 2009/0013347 A1 | 1/2009 | Ahanger et al. | |
| 2009/0024541 A1 | 1/2009 | Kremen | |
| 2009/0132805 A1 | 5/2009 | Ginter et al. | |
| 2009/0183245 A1 | 7/2009 | Simpson et al. | |
| 2009/0222320 A1 | 9/2009 | Arfin et al. | |
| 2009/0234685 A1 | 9/2009 | Tarbell et al. | |
| 2009/0234750 A1 | 9/2009 | Arfin | |
| 2009/0284386 A1 | 11/2009 | Nassimi | |
| 2009/0287543 A1 | 11/2009 | Allderdice et al. | |
| 2009/0327031 A1 | 12/2009 | Jain | |
| 2010/0141153 A1 * | 6/2010 | Recker | H05B 33/0803 315/149 |
| 2010/0179708 A1 | 7/2010 | Watson et al. | |
| 2010/0191575 A1 | 7/2010 | Raleigh | |
| 2010/0223180 A1 * | 9/2010 | Kremen | G06Q 10/10 705/40 |
| 2010/0244746 A1 | 9/2010 | Van De Sluis et al. | |
| 2010/0302578 A1 * | 12/2010 | Rego | G06F 11/0733 358/1.15 |
| 2011/0004570 A1 | 1/2011 | Saad et al. | |
| 2011/0015797 A1 | 1/2011 | Gilstrap | |
| 2011/0086611 A1 | 4/2011 | Klein et al. | |
| 2011/0106883 A1 | 5/2011 | Gupta et al. | |
| 2011/0178926 A1 | 7/2011 | Lindelsee et al. | |
| 2012/0020060 A1 * | 1/2012 | Myer | F21S 2/00 362/183 |
| 2012/0026726 A1 | 2/2012 | Recker et al. | |
| 2012/0043889 A1 * | 2/2012 | Recker | H05B 33/0815 315/86 |
| 2012/0232714 A1 | 9/2012 | Ricket | |
| 2014/0312802 A1 | 10/2014 | Recker et al. | |
| 2017/0093210 A1 * | 3/2017 | Recker | H02J 9/065 |

FOREIGN PATENT DOCUMENTS

| | | |
|---|---|---|
| WO | 97/34448 A1 | 9/1997 |
| WO | 02/33669 A1 | 4/2002 |
| WO | 2004/049585 A1 | 6/2004 |

OTHER PUBLICATIONS

Hara, "Sharp sees big picture for solar outdoor lighting," Electronic Engineering Times, Aug. 23, 2004, retrieved from URL=http://www.eetimed.com/document.asp?doc_id=151024& on Jun. 30, 2012, 2 pages.
International Search Report, dated Aug. 4, 2011, for International Application No. PCT/IB2011/000998, 5 pages.

(56) References Cited

OTHER PUBLICATIONS

International Search Report and Written Opinion of the International Searching Authority, dated Mar. 27, 2013, for International Application No. PCT/US2012/066136, 8 pages.

* cited by examiner

US 10,304,055 B2

TRANSACTION PROCESSING AND REMOTE ACTIVATION

BACKGROUND

Technical Field

Embodiments of the invention relate to processing a transaction and activating a device in dependence on the processed transaction.

Description of the Related Art

The vast majority of the human population earns very little money. With a low regular income, it is difficult to amass significant capital to purchase assets. A number of schemes have been developed to address this problem. For example, there is a system of "lay bys" whereby a person desiring to purchase an asset or a service pays a portion of the price in a number of payments. When the price has been paid off, the buyer is provided with possession of the asset or the service is rendered.

As an alternative, a number of credit facilities have been developed which include micro-finance hire purchase agreements, etc.

These known arrangements suffer from the disadvantage that it may take significant time for the purchaser to "lay by" the purchase price. Financing arrangements suffer from the disadvantage of being costly to implement and administer, and can be difficult to enforce, particularly in a rural environment. The purchaser will end up paying significantly more than the purchase price to cover the administration costs.

A further problem exists, particularly in developing economies, whereby once an asset has been purchased, insufficient planning is made to ensure for the maintenance of that asset. Therefore, assets which might otherwise be easily repaired are neglected to such an extent that repair becomes more expensive.

BRIEF SUMMARY

Aspects of the invention are set out in the accompanying claims.

An embodiment of the invention extends to a device (which may be considered an asset that is purchased or which provides a service that may be purchased) that can be controlled through the use of a mobile communications apparatus such as a cellular phone. The cellular phone is connected to a transaction processing system that allows a user to pay for the use of the device. The transaction processing system communicates with the device to allow usage of the device only if the user has successfully paid for such use. A further embodiment of the invention relates to collecting usage information of the device and collating this information at a location remote from the device.

BRIEF DESCRIPTION OF THE SEVERAL VIEWS OF THE DRAWINGS

Example embodiments of the invention are hereinafter described with reference to the accompanying diagrams which are not to scale and where.

DETAILED DESCRIPTION

The figures are schematic in nature and not drawn to scale, and are intended for illustrative purposes.

Figure 1:
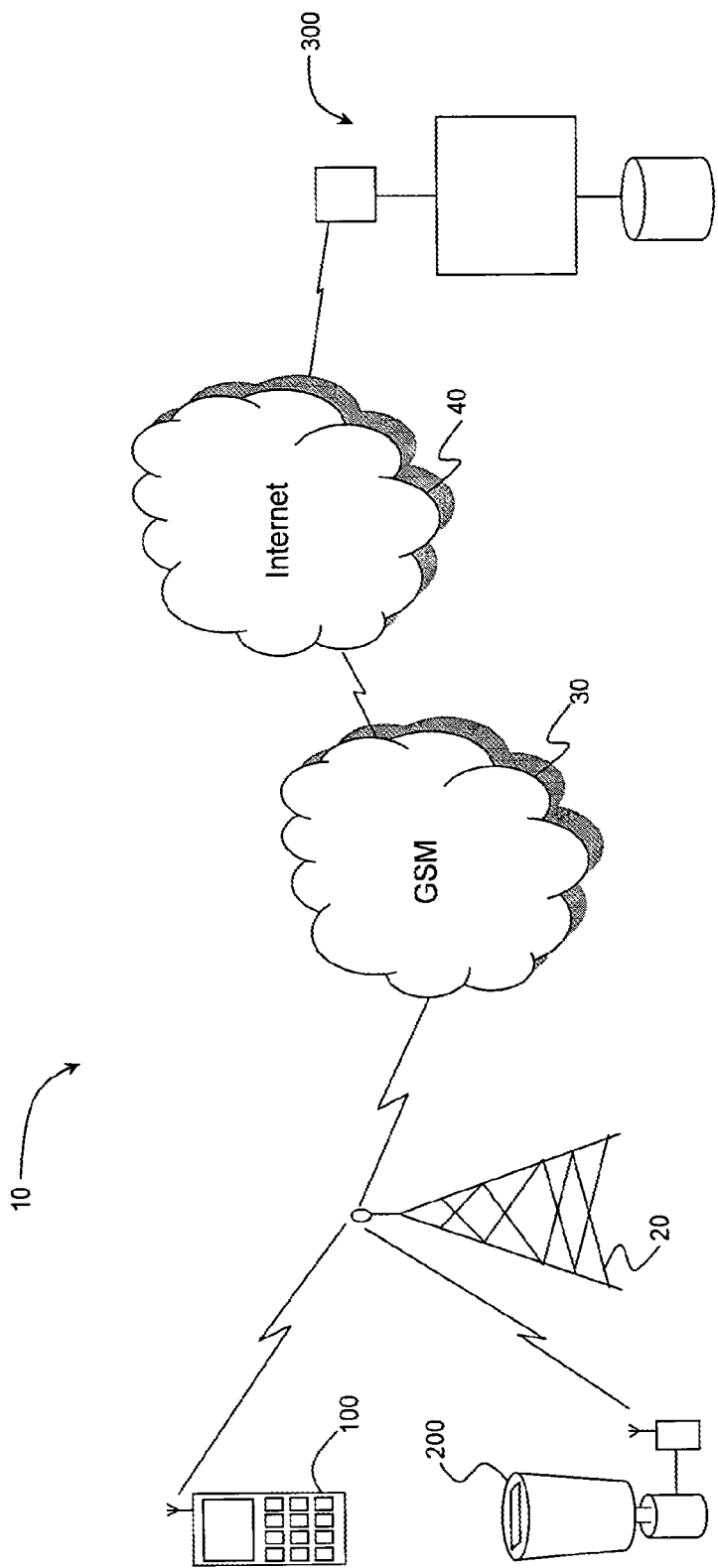
FIG. 1 illustrates a communication system according to an embodiment of the invention.

FIG. 1 illustrates a communication system 10 according to an embodiment of the invention. The communication system 10 includes a user interface, in this embodiment a mobile communications device in the form of cellular phone 100, connected to a cellular phone mast 20. In the embodiment shown, the cellular phone mast 20 is further connected to a solar-powered lamp 200. The cellular phone mast 20 is part of a GSM communications network, generally denoted by reference 30 in FIG. 1. The GSM communications network 30 is further connected to the Internet 40. A transaction processing system 300 is connected to the cellular phone 100 and the solar-powered lamp 200 via the Internet 40 and the GSM communications network 30.

In the embodiment illustrated in FIG. 1, the cellular phone 100 and the solar-powered lamp 200 communicate with the same cellular phone mast, cellular phone mast 20. It is to be realized that, although it may often be the case that the device to which embodiments of the invention are applied (in this case the solar-powered lamp 200) and the user interface (in this case the cellular phone 100) which is used to operate the device communicate via the same mast, embodiments of the invention are not limited in this respect. In further embodiments, the user interface and the device communicate with distinct and separate masts or communicate via other communication hardware and protocols.

Referring back to FIG. 1, the solar-powered lamp 200 communicates with the GSM communications network 30, as indicated. It is to be realized that the solar-powered lamp 200 is therefore provided with the necessary radio transmitters and receivers, as well as a Subscribers Identity Module (SIM) and the other necessary hardware and software to allow them to communicate via the GSM network, as described in greater detail below. The solar-powered lamp 200 interacts with the GSM communications network 30 in a similar manner to the way known cellular phones, such as cellular phone 100, operate. In this embodiment, the cellular phone 100 and the solar-powered lamp 200 communicate with the GSM communications network 30 through the use of general packet radio service (GPRS). It is to be realized however that the manner in which this communication, or any other communication, occurs is not essential to the operation of embodiments of the invention. In further embodiments, other wireless or wired communications protocols may be used.

Figure 2:
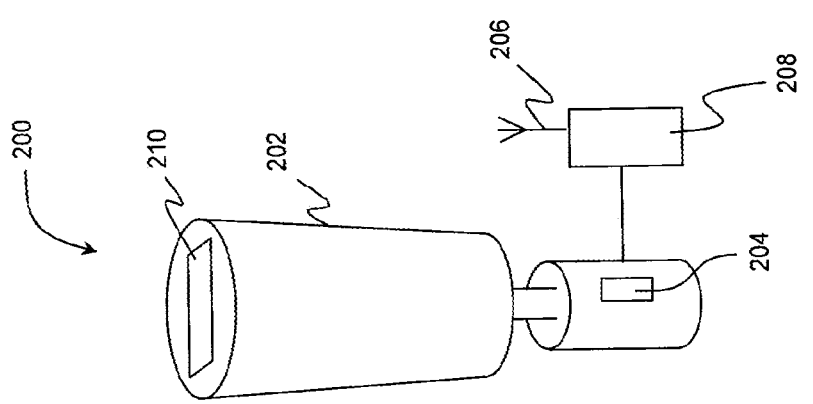
FIG. 2 illustrates a solar-powered lamp according to an embodiment of the invention.

FIG. 2 illustrates the solar-powered lamp 200 in greater detail. The solar-powered lamp 200 includes a lamp portion 202 which has an activation switch 204. The lamp portion 202 is connected to a control unit 208. The lamp portion 202 further comprises a photovoltaic cell 210. The photovoltaic cell 210 operates to charge a battery (see below) during exposure to sunlight so that the lamp 200 may operate when there is little or no ambient light. A user uses the activation switch 204 to turn the solar-powered lamp 200 on and off.

However, the lamp 200 will not activate (become functional) unless the control unit 208 allows this, in the manner described below.

Figure 3:
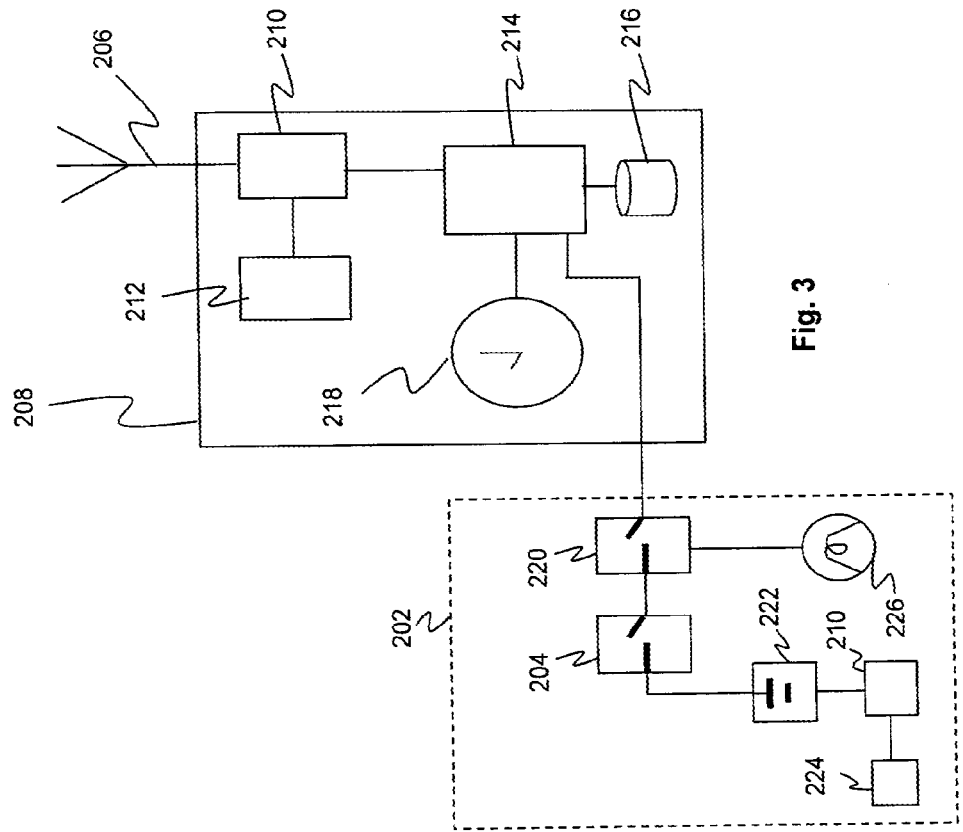
FIG. 3 illustrates a portion of the solar-powered lamp of FIG. 2.

The control unit 208 of the solar-powered lamp 200 is illustrated in greater detail in FIG. 3. As illustrated, the control unit 208 comprises an antenna 206. The antenna 206 is connected to a radio unit 210 which is, in turn, connected to a SIM 212. The antenna 206, radio unit 210 and SIM 212 operate together in a known manner so that the solar-powered lamp 200 (FIG. 2) may communicate over the GSM communications network 30 (FIG. 1). The radio unit 210 is further connected to a processor 214 having storage 216. The processor 214 is connected to a timer 218.

The control unit 208 is connected to the lamp portion 202 of the solar-powered lamp 200 (in this figure, indicated by dashed outline). The processor 214 is connected to a switch 220 which is in turn connected to a bulb 226. The activation switch 204 is connected to the processor 214 and to a battery 222. The battery 222 powers the lamp portion 202 and provides electrical power to the bulb 226 as well as the radio unit 210, processor 214, and the other components of the solar-powered lamp 200 which require electrical power. The battery 222 is recharged by the photovoltaic cell 210. In embodiments of the invention the battery 222 is independent of the mains power supply and therefore the lamp 200 is portable and may be used in areas which have no mains electricity supply or when the mains electricity supply is intermittent or otherwise unavailable.

The lamp portion 202 further comprises an ammeter 224 which measures the current drawn from, and delivered to, the battery 222. The processor 214 is connected to the ammeter 224 and the readings made by the ammeter 224 are stored by the processor 214 in storage 216.

The bulb 226 of the lamp 200 will only operate if the user has activated switch 204 to place this in the "on" position and the processor 214 has activated switch 220 to place this too in the "on" position. In this way, the processor 214 determines whether or not the lamp is operational even after a user has turned this on.

Furthermore, the processor 214 controls the radio unit 210 and thereby controls the manner and content of the communications of the solar-powered lamp 200 over the GSM communications network 30 (FIG. 1). The processor 214 utilizes storage 216 during its operations in a known manner. In particular, the storage 216 stores an indication of the amount of time that the solar-powered lamp may operate in the form of a credit. In the manner disclosed below with reference to FIG. 5, the user transfers credit from the transaction processing system 300 to the lamp 200. The storage 216 keeps a record of the available credit and the processor reduces this record as the lamp 200 is used. The timer 218 is utilized by the processor 214 to keep track of the usage of the lamp 200 and for ancillary purposes such as for date and time stamping communications. This timing information, together with the current information gleaned from the ammeter 224 is stored in the storage 216 and transferred as usage information to the transaction processing system 300 in the manner described below.

Figure 4:
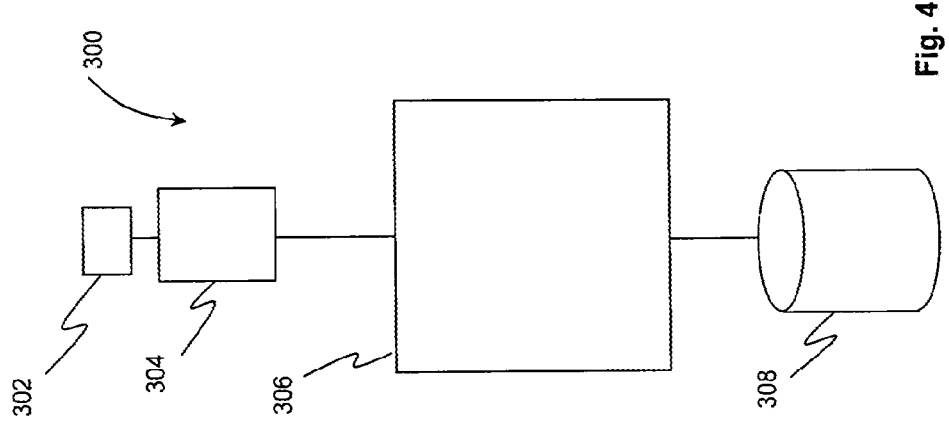
FIG. 4 illustrates a transaction processing system according to an embodiment of the invention.

FIG. 4 illustrates a transaction processing system 300 according to an embodiment of the invention. The transaction processing system 300 comprises an IP connection unit 304 having a socket 302. The transaction processing system 300 communicates with the Internet 40 in a manner known in the art by utilizing the socket 302 and the IP connection unit 304. In alternate embodiments, this connection is accomplished by communication protocols other than IP-related protocols, such as a GSM connection via a SIM card connected to the mobile network.

The transaction processing system 300 further comprises a processing unit 306 which controls the transaction processing system 300. The processing unit 306 is connected to storage 308 which is used to store data in the form of a database and associated data storage. It is to be realized that the illustration of the transaction processing system 300 in FIG. 4 is a schematic and many alternative ways of implementing such a system are known in the art.

In the embodiment illustrated, the transaction processing system 300 allows users to retain credit in personal accounts and transfer money into and out of such accounts, as well as between accounts within the transaction processing system, and accounts held elsewhere. As such, the transaction processing system is similar to known banking systems. The transaction processing system 300 furthermore allows users to operate their accounts (i.e. transfer amounts and purchase goods or services using money stored in their accounts) through the use of a cellular phone. Such transaction processing systems are known in the art, for example, the system operated in Kenya by GSM mobile operator Safaricom Limited under the trade name "M-PESA."

In certain embodiments of the invention, the transaction processing system may be arranged so that a user may optionally utilize funds stored on the transaction processing system to pay for use of the device. In an alternative embodiment, the transaction processing system is primarily used by the operator of the GSM communications network to allow a user to pay for the use of their cellular phone and in this embodiment credit used primarily to pay for use of the cellular phone may, in addition, be used to pay for usage of the device in a manner analogous to that described below with reference to FIG. 5.

The transaction processing system 300, by communicating via the Internet 40 by means of the IP connection unit 304 is able to control certain operational aspects of the solar-powered lamp 200, which is also connected to the Internet 40 via GSM communications network 30. The manner in which this occurs is described in greater detail below with reference to FIG. 5.

Figure 5:
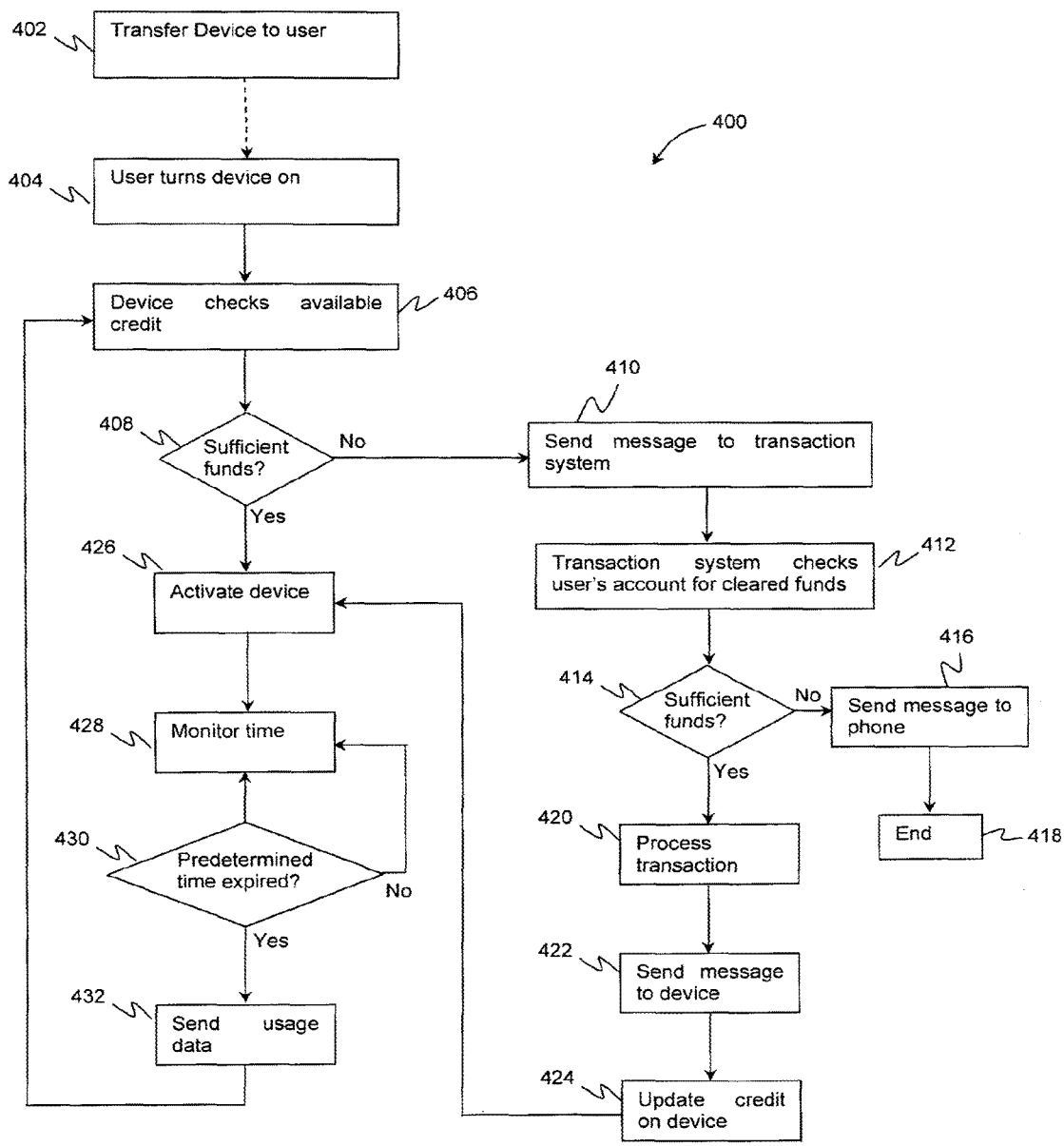
FIG. 5 illustrates a process of setting an operational state of the solar-powered lamp of FIG. 2 according to an embodiment of the invention.

FIG. 5 illustrates a process 400 according to an embodiment of the invention whereby the operational state of the solar-powered lamp 200 is controlled by the transaction processing system 300 on request by a user (not shown) interacting with the transaction processing system 300 by means of cellular phone 100.

At a preliminary step 402, the device (which, in this case, is the solar-powered lamp 200) is transferred to the user. In the embodiment illustrated, the preliminary step involves a user paying a deposit to a supplier who, in return, will supply the user with the device. Importantly, for embodiments of the invention, the deposit is less (in many instances significantly less) than the capital cost of the device.

During this preliminary step 402, the user's possession of the lamp 200 will be registered. The registration involves establishing a link between the device (in this embodiment identified by an identification number) and the user. As the user uses their cellular phone 100 to operate the lamp 200, this registration process will involve establishing a link between the user's cellular telephone number and the identification number of the lamp 200.

In the following step, step 404, the user turns the solar-powered lamp 200 on by activating activation switch 204 (FIG. 2). Steps 402 and 404 are linked by a dashed line indicating that step 402 is a preliminary step in as much as step 402 will occur only once whereas step 404 may occur many times during the lifespan of a device such as the solar-powered lamp 200.

At step 406, the processor 214 of the lamp 200 detects operation of switch 204 and checks the credit available for running the device by querying the record of that credit stored on the storage 216 (FIG. 3). The process will then proceed to step 408 where a determination is made whether the credit stored on the storage 216 is sufficient to operate the device.

If the available credit is not sufficient, the process will proceed to step 410 where the lamp will communicate with the transaction processing system 300 with a message in the manner discussed above. The message sent by the lamp 200 to the transaction processing system 300 will include an identification number by which the transaction processing system 300 will be able to identify the lamp 200 as well as a request to process a payment for use of the lamp 200 for a predetermined time. In this embodiment, the predetermined time is 8 hours.

At the following step, step 412, the transaction processing system 300 consults the account information held for the user who is determined, with reference to the identification number of lamp 200, to be the possessor of lamp 200. The transaction processing system 300 will thereby determine the amount of funds which the user has available to pay for use of the lamp 200.

At step 414, a determination is made whether the user has sufficient funds. If the user does not have sufficient funds, the process will move to step 416 where a message is sent to the user's cellular phone 100 informing them that they have insufficient funds, and reminding them to transfer additional funds. The process will then end at step 418. If the user subsequently transfers funds into his or her account, they will be able to restart the process by activating the switch 204, in which case the process will begin again at step 404.

If, on the other hand, at step 414 it is determined that the user has sufficient funds for the lamp to operate, the process will move on to step 420 where the transaction processing system 300 processes the payment for the device. This will involve debiting the user's account. Such transaction processing is known in the art and will not be further described herein. In a further embodiment referred to above, this step may involve debiting credit which would ordinarily be used by the user to pay for use of the cellular phone 100.

At the following step, step 422, the transaction processing system 300, by means of IP connection unit 304 and socket 302, will send a message to the lamp 200. This message will contain the identification number for the lamp together with an encrypted command to update the credit stored on the lamp 200.

At the following step, step 424, the lamp 200 receives the message sent by the transaction processing system 300. The processing unit 214 of lamp 200 will verify that the message was sent by the transaction processing system 300. In this embodiment this is done by verifying an encryption key, but in further embodiments this may occur in any one of known ways for verifying the sender of a message. Once the processing unit 214 of lamp 200 has verified that the message does, in fact, originate from processing system 300 it will perform the command specified in the message by updating the credit record stored on storage 316. In the embodiment illustrated, the only command issued by the transaction processing system 300 is to update the credit stored on the lamp 200. In a further embodiment however, the transaction processing system 300 issues other commands relating to the operational state of the device being controlled. For example, the transaction processing system 300 may communicate with the user by causing the lamp to flash on and off indicating that there is insufficient credit in their account. Alternatively, where the device is a device other than a lamp, the command issued by the transaction processing system may relate to the operation of the device. Once the credit on the lamp has been updated, the process will go on to step 426 where the lamp (the device in this embodiment) is activated (i.e. turned on) through the activation of switch 220. Therefore, once switch 220 is activated, both switch 204 and switch 220 will have been activated, allowing the lamp to operate.

Referring back to step 408, if it is determined that there are sufficient funds stored on the device at this step, the process will proceed to step 426 where the lamp is activated.

Once the lamp has been turned on in step 426, the process will move to step 428 where the time which has elapsed since the lamp 200 was turned on is monitored. Therefore, the process will continuously proceed from step 428 to decision step 430 to compare the elapsed time against the predetermined time. If the elapsed time is less than the predetermined time, the process will return to step 428. However, if the elapsed time is equal to, or greater than, the predetermined time, the process will then proceed to step 432.

In this embodiment, the predetermined time is the time which has been stored in the storage 216 associated with processing unit 214 of the solar-powered lamp 200 (as described above with reference to FIG. 3). Each time that the lamp 200 is activated, it is done for the predetermined time unless the user turns the lamp off through again activating switch 204 during this time, in which case the process will begin again at step 404. In a further embodiment, the time for the activation may form part of the message sent by the transaction processing system 300 in step 416. Alternatively, the user may determine the predetermined time period and specify this as a parameter when communicating with the transaction processing systems 300 with the cellular phone 100.

Once it is determined at step 422 that the predetermined time has elapsed, the process will proceed to step 432 where usage information for the lamp 200 is sent to the transaction processing system 300. In this embodiment, the usage information will be sent to the transaction processing system 300 once every eight hours as the predetermined time period of step 422 has been set to eight hours. The process will then proceed back to step 406 where a determination is made of the available credit stored on storage 216. In this manner, the lamp will keep track of the continued use of the lamp and ensure that sufficient credit remains for this use. When the lamp runs out of credit, the process will proceed to step 410 to obtain credit from the transaction processing system 300 in the manner described. At any point during the process defined by steps 406, 408, 426, 428, 430 and 432, the user may operate switch 204 which pauses the process. When the user reactivates switch 204, the process will continue from the same point where it was paused.

In a further embodiment, not illustrated in the accompanying figures, the operational state of the lamp 200 is changed from on to off by having the transaction processing system send a further command to the lamp 200 by message. In this embodiment, the transaction processing system 300 keeps track of the predetermined time period and, once this time period has elapsed, will send the message to turn the lamp 200 off.

Advantageously, with embodiments of the invention, the user is given possession of an asset, such as the solar-powered lamp 200, on payment of a deposit which is less than the cost of the device. The user will then pay for the use of the device for a predetermined time period and a portion of this cost will be attributed to the capital cost of the device. It will be realized that as the user continues to use the device, more and more of the capital cost will be repaid until all of the capital cost has been paid back. At this time, the ownership in the asset may be transferred to the user.

Figure 6:
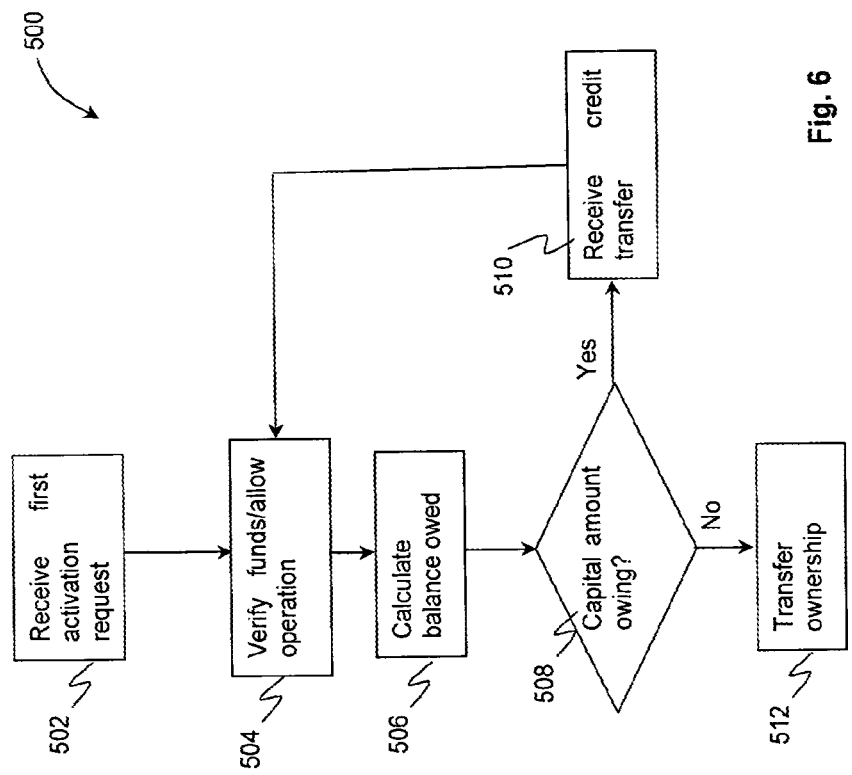
FIG. 6 illustrates a further process according to an embodiment of the invention.

FIG. 6 illustrates a process 500 whereby the transaction processing system 300 determines whether a user has paid off the capital cost of the device (in this embodiment, the solar-powered lamp 200). At the initial step 502 of process 500, the transaction processing system 300 receives a request from the user to activate the lamp 200 in the manner described above with reference to the process of FIG. 5.

When this initial request is received, the process will continue on to step 504 wherein a determination is made of the funds which the user has available and, if those funds are sufficient, the operational state of the lamp 200 will be changed from off to on (also in the manner described above).

In the following step, step 506, the capital amount owing in respect of the lamp 200 by the user will be calculated. If in the previous step, step 504, it was determined that the user has sufficient funds to allow the use of the lamp 200, the capital amount owing will be reduced in step 506 by the portion of the amount charged to the user for the use of the lamp 200 which has been apportioned to paying back the capital amount.

At the next step, step 508, a determination is made of the capital amount still owing by the user. If this has reduced to 0, the process will continue to step 512 where ownership in the lamp 200 will be transferred to the user. In this embodiment, transfer of ownership will involve allowing the user to use the lamp 200 without charging therefor. In order to facilitate this, the transaction processing system 300 will send a message to the lamp 200 which will thereafter allow use of the lamp 200 without requiring payment.

In an alternative embodiment, ownership of the lamp 200 will entitle the user to a reduced cost for the use of the lamp 200. In this embodiment, the usage costs may be processed as payments in respect of an insurance or maintenance policy covering repair of the lamp 200. The user will then be entitled to have the lamp 200 repaired, or be provided with a new lamp, should the lamp stop functioning.

Referring back to FIG. 6, if at step 508 it is determined that a portion of the capital amount is still outstanding, the process will proceed to step 510. At step 510, the transaction processing system will await the next credit transfer from the user. When the credit transfer is received, the transaction processing system 300 will return to step 504 and verify that the user has sufficient funds to allow usage of the lamp 200.

The usage information collected by the lamp and transferred to the transaction processing system 300 in step 432 of FIG. 5 may be used to keep track of how a user uses the lamp 200 or any other device in which embodiments of the invention have been implemented. Furthermore, this data may be used, in particular when the device relies on "renewable energy" such as solar or wind power, to calculate carbon offsets and apply them for that user or for an organization affiliated with that user.

In this manner, the transaction processing system 300 will continuously monitor and charge for usage of the lamp 200 until such time as the user has paid back the cost of the lamp.

In the embodiment illustrated and described above, the transaction processing system 300 interacts with the solar-powered lamp 200 to allow activation of the solar-powered lamp 200. In further embodiments, the control unit of the solar-powered lamp operates to collect information regarding the usage and state of the solar-powered lamp and communicate this information to the transaction processing system or to a further remote location where this information is stored and collated. In such embodiments, the solar-powered lamp will include the necessary sensors and storage medium to allow collection of the data.

In the embodiments illustrated and described above, the remotely-operated device is a solar-powered lamp. However, embodiments of the invention are not limited in this respect. It is to be realized that other devices may be substituted for the solar-powered lamp. For example, more substantial equipment such as an electrical generator, an automobile, a radio, etc., may be used.

The invention claimed is:

1. A system, comprising:
a device having components that require electrical power to operate;
a battery coupled in series with a processor connected switch and a user switch, wherein the battery delivers electrical power to the components in the device when both the processor connected switch and the user switch are activated and provide a circuit path for electrical power to flow from the battery to the components;
a transaction processing system remote from the device, the transaction processing system comprising a processing unit that is programmed to process payment transactions for usage of the device; and
a control unit with a processor configured to collect usage information pertaining to use of the device, wherein the processor is connected to the processor connected switch,
wherein the device and the transaction processing system communicate wirelessly, and wherein the transaction processing system determines whether to cause the processor to activate the processor connected switch based on an outcome of a payment transaction with the transaction processing system initiated by a mobile communications apparatus that is separate from the device,
wherein the processing unit of the transaction processing system is programmed to:
charge for a determined amount of use of the device, wherein an amount charged for use of the device includes a portion allocated to a capital cost of the device;
in response to successful processing of a payment for the amount charged:
store in a storage an indication of an amount of time that the device can operate in the form of a credit;
remotely cause the processor to activate the processor connected switch in the device so that, in response to user activation of the user switch in the device, the components in the device receive electrical power from the battery via the circuit path and operate for the determined amount of use; and
reduce the credit in the storage in accordance with the usage information collected by the processor, wherein the processor utilizes a timer in the control unit to track an amount of time the device is used; and
after successful processing of payments such that the capital cost of the device has been paid, remotely cause the processor to activate the processor connected switch in the device so that the components in the device remain operational in response to user activation of the user switch without further charges for the capital cost.

2. The system according to claim 1, wherein the battery is charged by a renewable energy source that is independent of a mains power supply.

3. The system according to claim 1, wherein the device having components that require electrical power to operate is any one of a lamp, a radio, or a kitchen appliance.

4. The system according to claim 1, wherein the transaction processing system is configured to process transactions relating to use of the mobile communications apparatus as a cellular phone.

5. The system according to claim 1, further comprising a processing module configured to calculate an amount of carbon offset based on the usage information collected by the processor.

6. The system according to claim 1, wherein when the processor connected switch and the user switch are activated, the components in the device are able to receive electrical power from the battery independent of whether the device is connected to a mains electrical supply.

7. The system according to claim 1, wherein in response to receiving user input, the device wirelessly communicates with the transaction processing system and receives, from the transaction processing system, an instruction that is based on successful processing of a payment with the transaction processing system, the instruction causing the processor to activate the processor connected switch in the device.

8. The system according to claim 1, wherein the device is a solar-powered lamp.

9. A solar-powered lamp comprising:
a control unit having a processor; and
a lamp portion having a user switch that is user activated, a processor connected switch that is connected to the processor, a bulb, and a battery that can supply electrical power to the bulb independent of a mains electrical supply depending on an operational state of the solar-powered lamp,
wherein the operational state of the solar-powered lamp is controlled by a remote transaction processing system based on an outcome of a payment transaction processed by the remote transaction processing system via wireless communication with a separate mobile communications apparatus,
wherein an amount charged by the remote transaction processing system for a determined amount of use of the solar-powered lamp includes a portion that is allocated to a capital cost of the solar-powered lamp;
wherein, in response to successful processing of a payment for the amount charged, the control unit is configured to receive, by wireless communication, a command from the remote transaction processing system that causes the control unit to activate the processor connected switch in the lamp portion for the determined amount of use;
wherein, while the processor connected switch is activated, user activation of the user switch allows electrical power to flow from the battery to the bulb; and
wherein after successful processing of payments such that the capital cost of the device has been paid, the control unit is configured to receive, by wireless communication, a command from the remote transaction processing system that causes the control unit to maintain activation of the processor connected switch without further charges for the capital cost.

10. The solar-powered lamp according to claim 9, wherein the operational state of the solar-powered lamp is one of functional or non-functional, and in the functional operational state, the processor connected switch is activated and electrically couples the battery to the bulb when the user switch is activated.

11. The solar-powered lamp according to claim 10, wherein the user switch and the processor connected switch are arranged in series between the battery and the bulb, and electrical power is supplied from the battery to the bulb via the user switch and the processor connected switch only when the operational state is functional and the user switch and the processor connected switch have been activated.

12. The solar-powered lamp according to claim 10, wherein the transaction processed by the remote transaction processing system involves an attempted payment and the operational state of the device is set to be functional for a predetermined amount of time in response to successful processing of the attempted payment.

13. The solar-powered lamp according to claim 12, wherein use of the solar-powered lamp for the predetermined amount of time is measured by a timer included in the solar-powered lamp.

14. The solar-powered lamp according to claim 12, wherein use of the solar-powered lamp for the predetermined amount of time is measured by a timer remote from the solar-powered lamp.

15. The solar-powered lamp according to claim 9, wherein processing of the payment transaction by the remote transaction processing system is initiated by user activation of the user switch.

16. The solar-powered lamp according to claim 9, wherein the lamp portion further comprises a photovoltaic cell that operates to charge the battery during exposure to light.

17. The solar-powered lamp according to claim 9, wherein the battery comprises an electro-voltaic cell.

18. The solar-powered lamp according to claim 9, wherein the control unit includes a radio unit that is communicatively connected to the remote transaction processing system via a wireless connection.

19. The solar-powered lamp according to claim 9, further comprising a processor and a storage, wherein the processor records usage information of the solar-powered lamp in the storage.

20. The solar-powered lamp according to claim 19, wherein the solar-powered lamp is configured to transmit the usage information to a memory remote from the device.

21. The solar-powered lamp according to claim 9, wherein the control unit further comprises a timer that is configured to record a time and/or duration of use of the solar-powered lamp.

22. The solar-powered lamp according to claim 9, wherein the amount charged for use of the solar-powered lamp is payable with credit in an account that otherwise is useable to pay for use of the separate mobile communications apparatus.

* * * * *